No. 880,461. PATENTED FEB. 25, 1908.
H. H. McGIFFIN & E. H. McCAULEY.
WIND GUARD.
APPLICATION FILED AUG. 28, 1907.
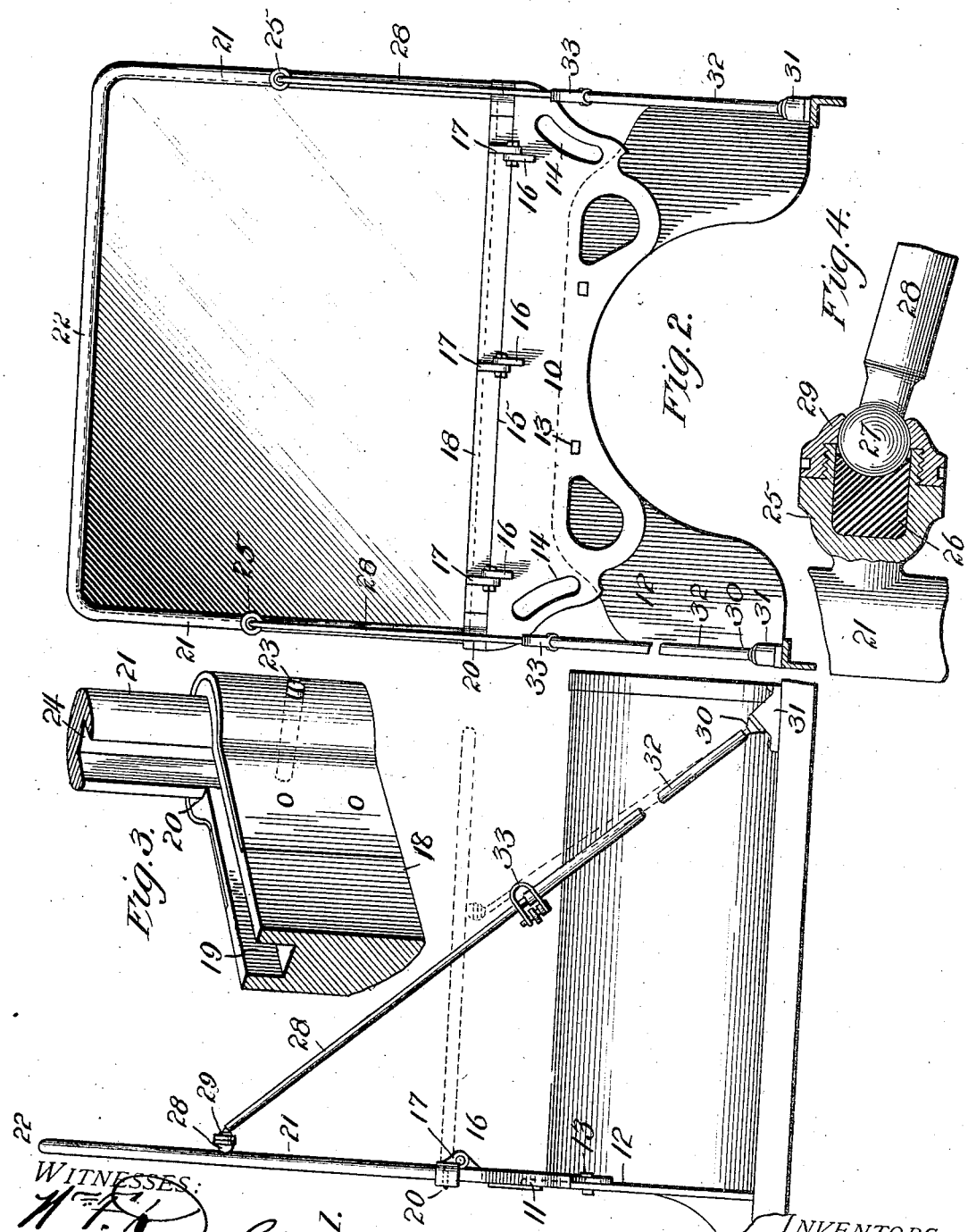
WITNESSES:
INVENTORS
Henry H. McGiffin
Edward H. McCauley.
BY
Attorney

UNITED STATES PATENT OFFICE.

HENRY H. McGIFFIN AND EDWARD H. McCAULEY, OF PITTSBURG, PENNSYLVANIA, ASSIGNORS OF ONE-THIRD TO JAMES P. BRENNAN, OF BRADDOCK, PENNSYLVANIA, AND ONE-THIRD TO W. L. ELFORD AND ONE-THIRD TO SAID McGIFFIN, OF PITTSBURG, PENNSYLVANIA.

WIND-GUARD.

No. 880,461. Specification of Letters Patent. Patented Feb. 25, 1908.

Application filed August 28, 1907. Serial No. 390,536.

*To all whom it may concern:*

Be it known that we, HENRY H. McGIFFIN and EDWARD H. McCAULEY, citizens of the United States, residing at Pittsburg, county of Allegheny, and State of Pennsylvania, have invented certain new and useful Improvements in Wind-Guards, of which the following is a specification, reference being had therein to the accompanying drawing.

This invention relates to a wind guard, and particularly to a device for supporting it in position to be folded.

The invention has for an object to provide a novel means for supporting the glass of the guard within an entirely metallic frame one portion of which is mounted to swing upon the other so that the guard may be disposed in a substantially horizontal position and offer no obstruction in the use of the vehicle.

Other and further objects and advantages of the invention will be hereinafter fully set forth and the novel features thereof defined by the appended claims.

In the drawing:—Figure 1 is a side elevation of the invention applied to an automobile; Fig. 2 is a front elevation thereof; Fig. 3 is a detail perspective, and Fig. 4 is a section through the ball and socket joint between the brace or clamping device by which the guard is held in vertical position.

Like numerals refer to like parts in the several figures of the drawing.

The numeral 10 designates the main frame or base upon which the guard is mounted and comprises a plate extending longitudinally of the front or dash board of the vehicle. This base is provided with the recess 11 to embrace the top of the dash board 12 and may be bolted or otherwise secured thereto, as shown at 13. The opposite sides of the base plate are provided with hand holds 14 by which it may be rapidly adjusted in position. The upper edge 15 is formed straight and adjacent thereto are a series of laterally projecting pivoting lugs 16 adapted to be connected to similar lugs 17 carried by the lower cross bar 18 of the glass frame. This bar is provided with a receiving groove 19 within which one edge of the glass is suitably packed, and is formed at each end with a socket 20 to receive the free ends 21 of the U-shaped glass frame 22 which are removably secured thereto by a cross pin 23. This glass frame is grooved as shown at 24 throughout its entire inner face to receive the glass and packing therefor.

Each of the side bars 21 of the glass frame has rigidly secured thereto a socket 25, as shown in Fig. 4. This socket is provided with the block of rubber 26 in contact with which the ball 27 on the brace rod 28 is held by means of the cap 29 threaded upon the socket and embracing the ball to form a ball and socket joint. This elastic packing prevents rattling of the parts and provides a solid but yielding connection. These parts are duplicated at the lower end of the brace, as shown at 30 where the socket is mounted upon a foot block 31 fixed in position upon the frame of the vehicle.

The brace may be of any desired construction, but preferably composed of the telescoping members 28 and 32 clamped in their relative position for the adjustment of the guard by means of the device shown at 33 which is specifically described in our application filed June 26, 1907, Serial No. 380,924.

The brace when extended and secured by the clamping device retains the guard in vertical position, as shown by full lines in Fig. 1, and the construction of the metallic frame effectually guards against warping of the glass frame and the loosening thereof, while it also strengthens the guard and provides a hinged joint by which the base of the glass frame rests on the firm support of the base plate of the guard. By this construction the glass may first be inserted in the U-shaped steel frame for that purpose and this frame with the glass then seated in the grooved bar pivoted at the top of the base, and when the parts are thus connected together the glass is rigidly supported and there is no danger of breakage when the guard is folded into its downward position, as shown by dotted lines, at which time the elastic connection between the ball and socket joints act to relieve all the strain, while the clamping device is set to prevent any vertical movement of the folded frame. It will thus be seen that the invention presents a simple, economically constructed and very efficient wind guard particularly adapted to the rough usage to which such devices are subjected in automobile use. The universal joint permits a lateral separation of the braces to fit the frame of different sizes or constructions of automobiles to which they may be applied.

Having described my invention and set forth its merits, what I claim and desire to secure by Letters Patent is:—

1. In a wind guard, a U-shaped glass frame grooved on its inner face, a grooved bottom bar having sockets for the ends of said frame, an attaching plate, and means for pivoting said bottom bar to the upper edge of said plate.

2. In a wind guard, a U-shaped glass frame, a bottom bar for said frame, an attaching plate having spaced parallel members to embrace a portion of a vehicle and pivoting lugs thereon at its upper edge, downwardly extending lugs upon said bottom bar pivoted to said plate lugs, a brace rod disposed at the front of said guard, and a ball and socket joint between said rod and frame.

3. In a wind guard, an attaching frame provided with separated plates forming an embracing portion at its lower edge and a straight upper edge, lateral pivoting lugs disposed at the upper edge, a grooved cross bar provided with lateral lugs pivoted to those of the attaching frame, sockets at the opposite ends of said cross bar, and a continuous bent glass frame having a grooved inner face and its free ends seated in said sockets.

4. In a wind guard, an attaching frame, a grooved cross bar pivoted to the attaching frame, sockets at the opposite ends of said cross bar, a glass frame comprising a continuous U-shaped metal bar grooved throughout its inner face and seated at its free ends in said sockets, and securing pins extending through said sockets and free ends.

5. In a wind guard, an attaching plate, a glass frame secured thereto and provided upon one face with a fixed socket, a packing cushion in said socket, a supporting block secured to a fixed part, a brace rod provided with a ball at one end disposed in contact with the cushion in said socket, and a cap threaded upon said socket and embracing a portion of said ball.

In testimony whereof we affix our signatures in presence of two witnesses.

HENRY H. McGIFFIN.
EDWARD H. McCAULEY.

Witnesses:
ALFRED T. GAGE,
JOHN L. FLETCHER.